L. E. SMITH.
FLUSHING APPARATUS FOR SUBMERGED WATER PIPES.
APPLICATION FILED JAN. 30, 1912.
1,085,502.
Patented Jan. 27, 1914.
2 SHEETS—SHEET 1.
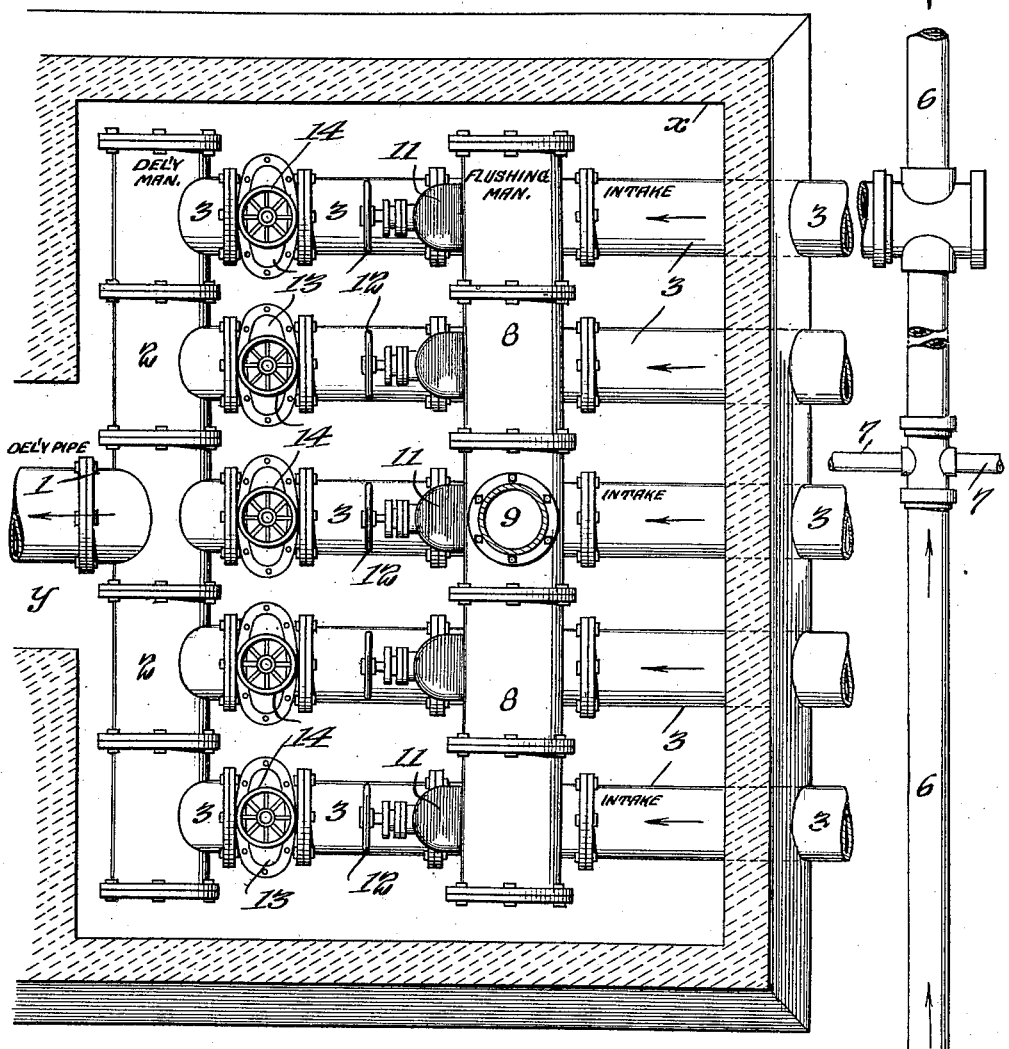
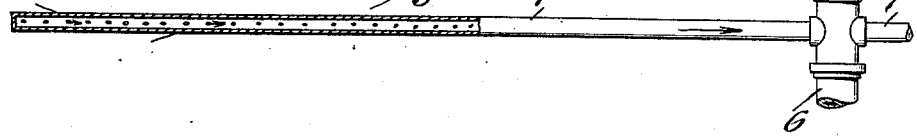
WITNESSES
INVENTOR
LLOYD E. SMITH
BY
ATTORNEYS

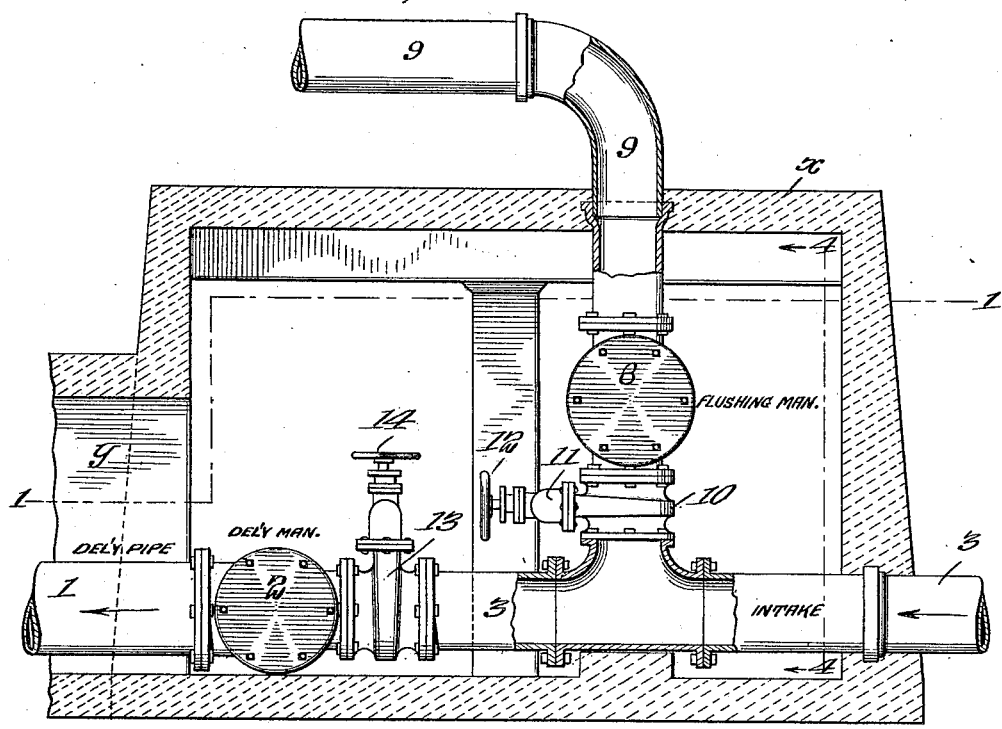
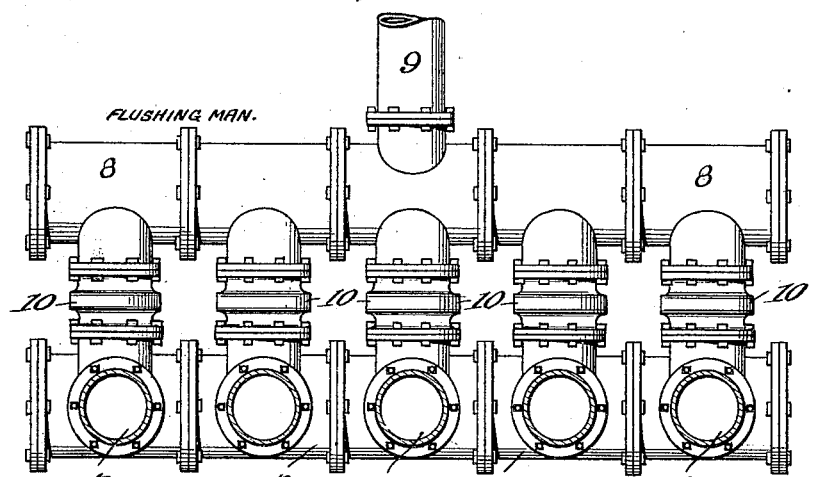

UNITED STATES PATENT OFFICE.

LLOYD E. SMITH, OF CHARLESTON, WEST VIRGINIA.

FLUSHING APPARATUS FOR SUBMERGED WATER-PIPES.

1,085,502.  Specification of Letters Patent.  Patented Jan. 27, 1914.

Application filed January 30, 1912. Serial No. 674,352.

*To all whom it may concern:*

Be it known that I, LLOYD E. SMITH, a citizen of the United States, and a resident of Charleston, in the county of Kanawha and State of West Virginia, have invented an Improved Flushing Apparatus for Submerged Water-Pipes, of which the following is a specification.

I have received Letters Patent of the United States, No. 699,032, for a system of water filtration and supply for towns and cities. In such system the water intake pipes which are provided with small openings or slots are laid in a natural sand and gravel bed in the bottom of a river or lake, and other pipes connected therewith are extended to a pump-house located on the bank at a greater or less distance from the source of supply. It is expedient and even necessary to flush the intake pipes occasionally in order to remove foreign matter which may have accumulated in the inlets proper or on the sand and gravel bed in which the pipes are laid. For this purpose, I have devised and put in practical use the apparatus forming the invention hereinafter described, and illustrated in the accompanying drawings, in which—

Figure 1 is mainly a plan view of the apparatus taken on the line of section 1—1 indicated in Fig. 3, the same including a cement house or inclosure. Fig. 2 is a plan view of one of the intake pipes and perforated laterals with which my apparatus is operatively connected. Fig. 3 is an end view of the apparatus, the cement inclosure being shown in vertical section. Fig. 4 is a vertical section of the apparatus on the line 4—4 of Fig. 3.

The apparatus is shown located in and protected by a water-tight cement inclosure $x$, the same having at one side a conduit $y$ through which a delivery pipe 1 extends, in practice, to a pump-house, not shown, such pump-house being located more or less remote from the source of supply. In practice also, the apparatus here referred to will be located intermediately of the pump-house and the intake, and the intake pipes will be buried in the ground and extend to the river or lake where the perforated intake pipes are buried in a sand and gravel bed. The said delivery pipe 1 connects with a horizontal manifold 2, which is in turn connected to a series of parallel intake pipes 3 varying in number as required by the capacity of the plant. The pipes 3 extend out through the wall of the cement inclosure $x$ and to the sand and gravel beds (not shown) wherein their terminal portions comprising branches 6 and perforated smaller laterals 7 are buried—see Fig. 2. In view of the functions of manifold 2 it may be distinguished, for convenience of reference, as the delivery manifold.

Directly above the several intakes 3 is arranged a horizontal manifold 8, which, in view of its function hereinafter described, may be termed the flushing manifold. From the latter a pipe 9—see Fig. 3—leads out through the top of the cement inclosure $x$ and in practice to a water tower, elevated stand-pipe, or reservoir located at such height above the apparatus described as required to provide a head or pressure of water sufficient to effect the desired flushing operation.

The manifold 8 is connected with intakes 3 by means of short pipes 10, each of which is provided with a horizontal cut-off valve 11, the same being operated by a hand-wheel 12 applied to a threaded rod, or otherwise suitably arranged for operating the valve to open or cut off communication between parts 3 and 8. Each of the intake pipes 3 before referred to as connecting with the manifold 2 is provided with a cut-off valve 13 having a hand-wheel attachment 14, the said valve being arranged vertically and adapted to open or close the pipes 3.

The operation of my improved apparatus may now be readily understood. Ordinarily, or when flushing is not required, the valves 11, applied to the pipes 10 connecting with manifold 8, will be closed, and, contrariwise, the valves 13, applied to the pipes 3 connecting with manifold 2 will all be open. Thus the operation of the pump, not shown, will draw water through pipe 1, manifold 2, and the series of intake pipes 3. If now it be desired to flush any one of the intake pipes 3 the valve 13 of that pipe is closed, and the valve 11 connecting with manifold 8 is opened, with the obvious result that inflow or delivery of water from the pipe 3 referred to is cut off and water from the standpipe 9 flows, under pressure, through the manifold 8, into the particular pipe 3 which requires flushing. Thus whatever "head" or pressure of water is in the stand-pipe will be applied for flushing the selected intake pipe 3, while the inflow and delivery of water from all the other intakes 3 proceeds as before, or without any hindrance or interruption. In other words, with the apparatus constructed and adapted to operate as described, one or more intakes may be flushed at will without disturbing or hindering the normal inflow of all the others not cut off by operating valves 13.

What I claim is:—

The improved flushing apparatus for intake pipes used in sand-beds in the bottom of rivers and other waters, the same comprising a series of separate water intake pipes, a flushing manifold arranged transversely and horizontally over said intake pipes, short vertical pipes connecting the manifold and the respective intake pipes, a manually operated valve arranged in each of such vertical connecting pipes, a pressure pipe leading upwardly from the manifold, a horizontal delivery manifold with which the forward ends of all the intake pipes are connected, cut-off valves applied to the several intake pipes adjacent to, and in rear of, such delivery manifold, and a pump pipe connected with the delivery manifold on its outer side, as described.

LLOYD E. SMITH.

Witnesses:
B. W. PEYTON,
CHAS. A. WELLS.

Copies of this patent may be obtained for five cents each, by addressing the "Commissioner of Patents, Washington, D. C."